United States Patent
Boyapalle et al.

(10) Patent No.: US 12,277,084 B2
(45) Date of Patent: Apr. 15, 2025

(54) CONTEXT-BASED WORKSPACE PERSONALIZATION USING AN EXPERIENCE ID

(71) Applicant: Dell Products L.P., Round Rock, TX (US)

(72) Inventors: Anantha K. Boyapalle, Cedar Park, TX (US); Ramanujam Kaniyar Venkatesh, Bangalore (IN); Srinivasa Ragavan Rajagopalan, Bangalore (IN)

(73) Assignee: Dell Products L.P., Round Rock, TX (US)

(*) Notice: Subject to any disclaimer, the term of this patent is extended or adjusted under 35 U.S.C. 154(b) by 41 days.

(21) Appl. No.: 18/318,398

(22) Filed: May 16, 2023

(65) Prior Publication Data
US 2024/0385984 A1    Nov. 21, 2024

(51) Int. Cl.
*G06F 13/38* (2006.01)
(52) U.S. Cl.
CPC ................ *G06F 13/385* (2013.01)
(58) Field of Classification Search
CPC .................................................. G06F 13/385
See application file for complete search history.

(56) References Cited

U.S. PATENT DOCUMENTS

| | | | |
|---|---|---|---|
| 11,004,422 B1* | 5/2021 | Bull | G06F 16/9577 |
| 2013/0237199 A1* | 9/2013 | Djavaherian | H04W 4/023 |
| | | | 455/418 |
| 2021/0271430 A1* | 9/2021 | Haapanen | G06F 3/1257 |
| 2022/0327493 A1* | 10/2022 | Bach | H04L 63/061 |
| 2024/0007825 A1* | 1/2024 | Vajravel | H04W 4/029 |

* cited by examiner

*Primary Examiner* — David E Martinez
(74) *Attorney, Agent, or Firm* — Kirton McConkie; Brian Tucker

(57) ABSTRACT

Context-based workspace personalization is provided using an experience ID. An agent can be used on a user computing device to monitor for context of a workspace. Based on context, the agent can generate and send a manifest and an experience ID generated from the manifest to a workspace management service. The workspace management service can use the experience ID to identify whether a manageability snapshot exists for the workspace in its current context. If so, the workspace management service can send the manageability snapshot to the agent which in turn can apply the manageability snapshot to customize the workspace to the user's preferences. When the user makes changes to configurations of the workspace, the agent can relay such changes to the workspace management service using the experience ID to thereby cause such changes to be reflected in a corresponding manageability snapshot.

15 Claims, 11 Drawing Sheets

| Workspace Characteristics | Workspace Peripherals | Peripheral Characteristics | Experience ID |
|---|---|---|---|
| Location = Home<br>User = UserID1<br>Device_ID = 6dea...<br>... | Laptop = Dell Latitude 9520<br>Dock = Dell WD19S USB-C Dock<br>Monitor 1 = Dell S3221QS<br>Monitor 2 = Dell S2722DZ<br>KB/Mouse = Dell KM3322W<br>Webcam = Dell Ultrasharp | Monitor 1: 32 inch, HDMI, 3840x2160<br>Monitor 2: 27 inch, HDMI, 3840x2160, webcam<br>Webcam: 4k, USB-3.0<br>... | 52cbaa7a... |
| Location = Home<br>User = UserID1<br>Device_ID = 6dea...<br>... | Laptop = Dell Latitude 9520<br>Dock = Dell WD19S USB-C Dock<br>Monitor = Dell S2722DZ<br>KB/Mouse = Dell KM3322W | Monitor: 27 inch, HDMI, 3840x2160, webcam<br>... | 0a47e479... |
| Location = Office<br>User = UserID1<br>Device_ID = 6dea...<br>... | Laptop = Dell Latitude 9520<br>Dock = Dell WD19S USB-C Dock<br>Monitor = Dell KM3322W<br>Webcam = Integrated | Monitor: 32 inch, HDMI, 3840x2160<br>Webcam: 1280 x 730 at 30 fps<br>... | 69426792... |
| Location = Office<br>User = UserID1<br>Device_ID = 6dea...<br>... | Laptop = Dell Latitude 9520<br>Dock = Dell WD19S USB-C Dock<br>Monitor 1 = Dell U3223QE<br>Monitor 2 = Dell S3221QS<br>Webcam = Dell Ultrasharp | Monitor 1: 32 inch, HDMI, 3840x2160<br>Monitor 2: 27 inch, HDMI, 3840x2160, webcam<br>Webcam: 4k, USB-3.0<br>... | 52cbaa7a... |

FIG. 3

```
{                                    {                                    {                                    {
"ExperienceID": 52cbaa7a...          "ExperienceID": 0a47e479...          "ExperienceID": 69426792...          "ExperienceID": 52cbaa7a...
"SnapshotID": ...                    "SnapshotID": ...                    "SnapshotID": ...                    "SnapshotID": ...
"Location": Home                     "Location": Home                     "Location": Home                     "Location": Home
"User": UserID1                      "User": UserID1                      "User": UserID1                      "User": UserID1
"Preferences": [                     "Preferences": [                     "Preferences": [                     "Preferences": [
  {                                    {                                    {                                    {
  "Device": "Primary Monitor"          "Device": "Primary Monitor"          "Device": "Primary Monitor"          "Device": "Primary Monitor"
  "Configuration": [{                  "Configuration": [{                  "Configuration": [{                  "Configuration": [{
    "Name": "Resolution",                "Name": "Resolution",                "Name": "Resolution",                "Name": "Resolution",
    "Value": "1920x1080"                 "Value": "1920x1080"                 "Value": "1280x1024"                 "Value": "1920x1080"
    },{                                  },{                                  },{                                  },{
    "Name": "RefreshRate",               "Name": "RefreshRate",               "Name": "RefreshRate",               "Name": "RefreshRate",
    "Value": "60Hz"                      "Value": "60Hz"                      "Value": "60Hz"                      "Value": "60Hz"
    },{                                  },{                                  },{                                  },{
    "Name": "Color",                     "Name": "Color",                     "Name": "Layout",                    "Name": "Color",
    "Value": "1.07b"                     "Value": "1.07b"                     "Value": "Portrait"                  "Value": "1.07b"
    }                                    }                                    }                                    }
  ]                                    ]                                    ]                                    ]
  },{                                  },{                                  },{                                  },{
  "Device": "Secondary Monitor"        "Device": "Webcam"                   "Device": "Audio"                    "Device": "Secondary Monitor"
  "Configuration": [{                  "Configuration": [{                  "Configuration": [{                  "Configuration": [{
                                         "Name": "HDR",                       "Name": "AudioVolume",
                                         "Value": "False"                     "Value": "30"
                                         },{                                  },{
                                         "Name": "Zoom",                      "Name": "MicVolume",
                                         "Value": "50"                        "Value": "30"
                                         }                                    }
                                       ]                                    ]
  ...                                  },...                                },{                                  ...
  },{                                                                       ...                                  },{
  "Device": "Webcam"                                                                                             "Device": "Webcam"
  "Configuration": [{                                                                                            "Configuration": [{
  ...                                                                                                            ...
```

*FIG. 4*

CONTEXT-BASED WORKSPACE PERSONALIZATION USING AN EXPERIENCE ID

CROSS-REFERENCE TO RELATED APPLICATIONS

N/A

BACKGROUND

A user may oftentimes use his or her user computing device in a workspace. In this context, a workspace can be viewed as an environment that includes a user computing device (e.g., a laptop) and peripherals that are connected to the user computing device. Such peripherals may commonly include external displays, a keyboard, a mouse, a webcam, a printer, a speaker, a fingerprint scanner, etc. Oftentimes, a workspace may include a wired or wireless dock by which the user computing device connects to some or all the peripherals.

A workspace may oftentimes be used for hybrid work scenarios. For example, a business may have an office space that includes hoteling cubes that can be assigned to, reserved by, or otherwise utilized by the business's employees as workspaces. In such cases, the business may allow its employees to connect their laptops to a dock in a particular hoteling cube where various peripherals may be available for use. Users may also employ workspaces when working from home.

When a user employs multiple workspaces (e.g., by connecting a laptop to different combinations of peripherals during a workday), it can be tedious for the user to configure the workspaces to his or her preferences. For example, while using one workspace, the user may set configurations for the peripherals of the workspace to match the user's preferences. If the user switches to a different workspace, those configurations may not be consistent with the peripherals of the different workspace or may result in unintended changes. The user may therefore have to manually reconfigure the workspace.

As one particular example, a user may have a home workspace that includes a 4 k monitor with 3840×2160 resolution at 60 Hz that is in landscape orientation and that also includes a 32-inch FHD monitor with 1920×1080 resolution that is in portrait orientation. This user may have set configurations for this home workspace to personalize these display devices. The user may also have access to multiple office workspaces (e.g., in a hoteling scenario), and these workspaces may have different sets of peripherals such as a first office workspace with two display devices and a second office workspace with a single display device. If the user's configurations to the home workspace are applied to the office workspaces, the display device(s) will likely not be configured in accordance with the user's preferences. The user will then need to manually configure the office workspace to achieve his preferences. When the user returns to his home workspace, he may again be required to manually configure the home workspace. As can be seen, when using multiple workspaces, personalized configurations are likely to be lost or misapplied due to the mismatching set of peripherals that make up the workspaces.

These issues arise in cases where the user switches between entirely different workspaces (e.g., when leaving home where a home workspace is used to travel to work where an office workspace is used) as well as in cases where the user creates a different workspace through the connection and/or disconnection of a peripherals (e.g., when connecting an external webcam to a dock or laptop that is part of an existing workspace).

BRIEF SUMMARY

The present invention extends to systems, methods, and computer program products for context-based workspace personalization using an experience ID. An agent can be used on a user computing device to monitor for context of a workspace. Based on context, the agent can generate and send a manifest and an experience ID generated from the manifest to a workspace management service. The workspace management service can use the experience ID to identify whether a manageability snapshot exists for the workspace in its current context. If so, the workspace management service can send the manageability snapshot to the agent which in turn can apply the manageability snapshot to customize the workspace to the user's preferences. When the user makes changes to configurations of the workspace, the agent can relay such changes to the workspace management service using the experience ID to thereby cause such changes to be reflected in a corresponding manageability snapshot.

In some embodiments, the present invention may be implemented as a method for performing context-based workspace personalization using an experience ID. An agent executing on a user computing device can create a manifest to represent a workspace that includes the user computing device and one or more peripherals. The agent can generate an experience ID from the manifest. The agent can send the manifest and the experience ID to a workspace management service. The agent can receive, from the workspace management service, a manageability snapshot associated with the experience ID. The agent can apply the manageability snapshot to thereby customize the workspace.

In some embodiments, the present invention may be implemented as computer storage media storing computer executable instructions which when executed implement a method for performing context-based workspace personalization using an experience ID. An agent executing on a user computing device can detect a change in context of a workspace that includes the user computing device and one or more peripherals. The agent can generate a manifest that identifies the change in context. The agent can generate an experience ID from the manifest. The agent can send the manifest and the experience ID to a workspace management service. The workspace management service can determine whether a manageability snapshot is associated with the experience ID. When the manageability snapshot is associated with the experience ID, the workspace management service can update the manageability snapshot, whereas when a manageability snapshot is not associated with the experience ID, the workspace management service can create a manageability snapshot.

In some embodiments, the present invention may be implemented as a system that includes a workspace management service and at least one user computing device on which an agent is executed. The agent can create a manifest to represent a workspace that includes the user computing device and one or more peripherals. The agent can generate an experience ID from the manifest. The agent can send the manifest and the experience ID to the workspace management service. The agent can receive, from the workspace management service, a manageability snapshot associated with the experience ID. The agent can apply the manageability snapshot to thereby customize the workspace.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIG. 3 provides various examples of the type of information that may be included in a manifest representing a workspace and corresponding experience IDs;

FIG. 4 provides various examples of manageability snapshots; and

DETAILED DESCRIPTION

In this specification and the claims, the term "user computing device" should be construed as encompassing any computing device that a user uses in a workspace. A user computing device may oftentimes be a laptop but could also be a desktop, a tablet, a smart phone, etc.

Figure 1:
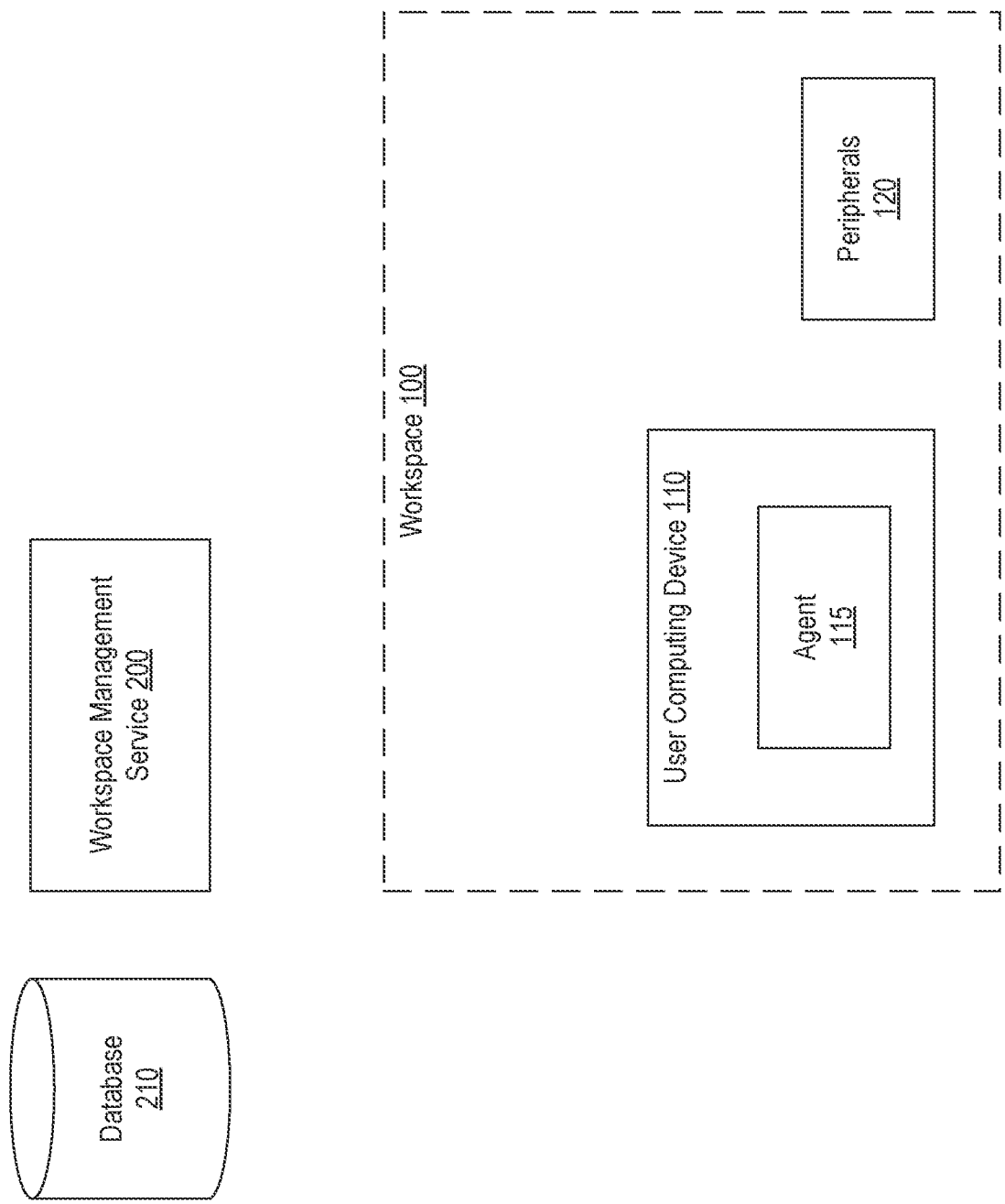
FIG. 1 provides an example of a computing environment in which embodiments of the present invention may be implemented.

FIG. 1 provides an example of a computing environment in which embodiments of the present invention may be implemented. This computing environment includes a workspace 100 formed by a user computing device 110 and a number of peripherals 120. Although they are illustrated as being separate from user computing device 110, peripherals 120 should be construed as including devices internal to user computing device 110 (e.g., a built-in webcam, speaker, microphone, display, keyboard, etc.) and not only devices external to user computing device 110. User computing device 110 can include an agent 115 for implemented context-based workspace personalization as described below. Although not shown, the computing environment represented in FIG. 1 would include multiple workspaces of which user computing device 110 may form a part.

The computing environment of FIG. 1 also includes a workspace management service 200 which may typically be hosted in the cloud or otherwise on a server. Workspace management service 200 may leverage database 210 to implement context-based workspace personalization using an experience ID as described below.

As an overview, agent 115 can function as a contextual analyzer within any workspace of which user computing device 110 may form a part for the purpose of identifying when a workspace's context should be reported to workspace management service 200. This context may include one or more of peripheral context (e.g., which peripherals are part of the workspace), new application context (e.g., context relating to the launch of an application on user computing device 110), and day/time/location context (e.g., context relating to the day, time and/or location of user computing device 110), among possibly other types of context. Workspace management service 200 can be configured to receive agent 115's reports of a workspace's context and can determine whether and how the workspace should be personalized based on the context.

FIGS. 2A-2D is a flow diagram representing how agent 115 and workspace management service 200 can interact to create an experience ID for a particular workspace and to use the experience ID to associate a manageability snapshot with the particular workspace. The process represented in these figures could be performed at any time such as at startup or whenever it is determined that user computing device 110 is part of a workspace.

Figure 2A:
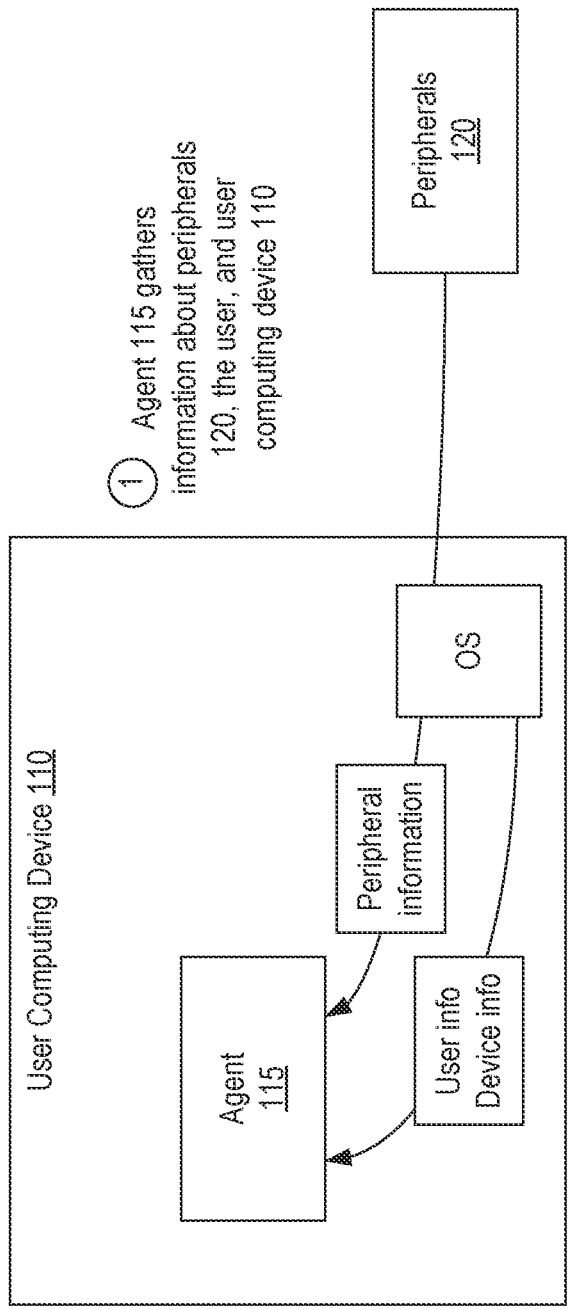
FIGS. 2A-2D provide an example of how an experience ID may be used to create and associate a manageability snapshot with a workspace.

Turning to FIG. 2A, in step 1, agent 115 can gather information about peripherals 120, information about the user of user computing device 110 (e.g., a user ID), and information about user computing device 110 (e.g., an ID and a location (e.g., home, office, or public location)). Agent 115 may perform this step at each startup of user computing device 100, at periodic intervals, on demand, in response to detecting the connection or disconnection of a peripheral, or in response to detecting some other change in context. In short, step 1 can represent functionality that agent 115 performs to identify when user computing device 110 is part of a workspace and to collect information for defining the workspace.

Figure 2B:
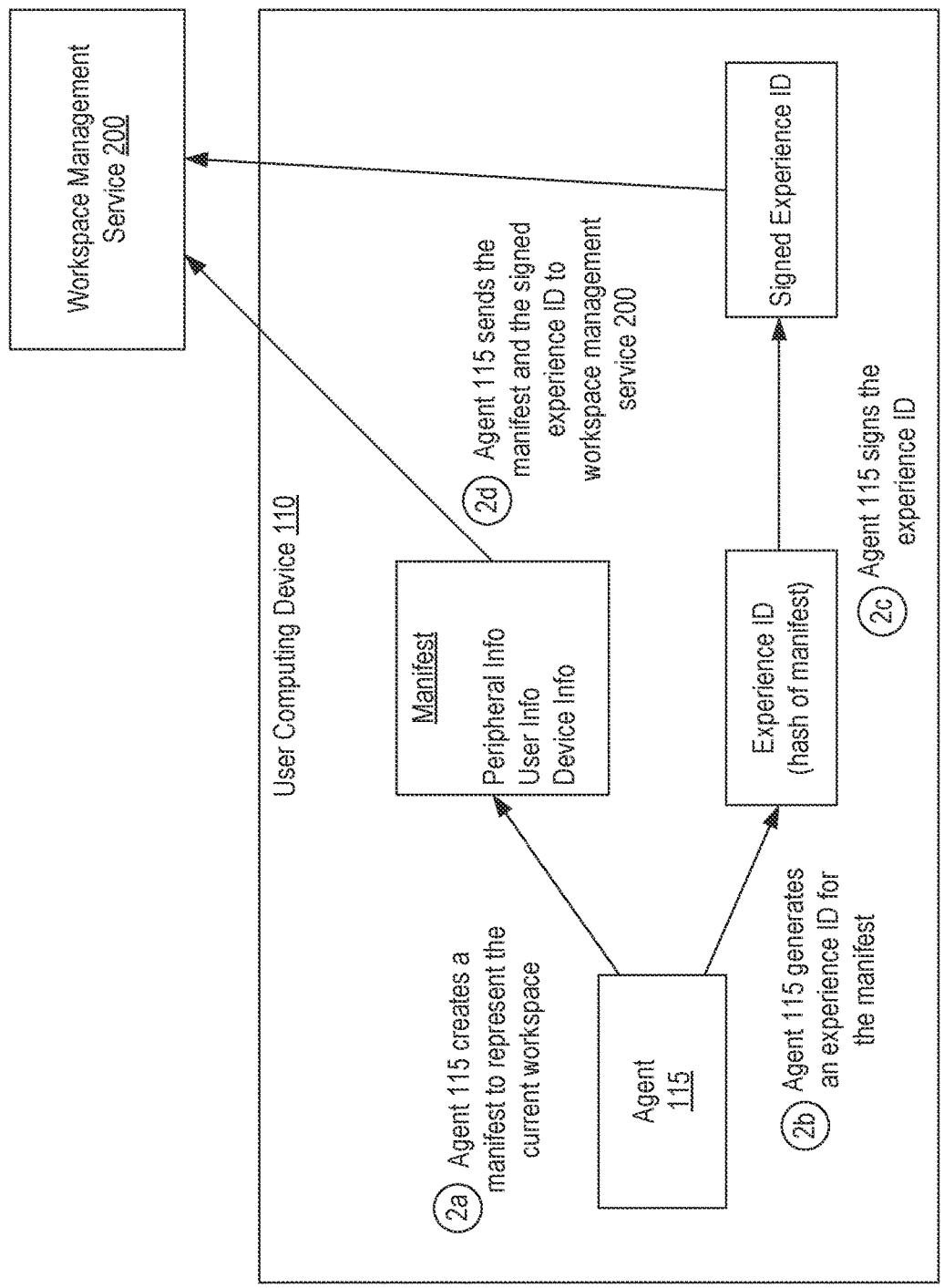

Turning to FIG. 2B, in step 2a, agent 115 can create a manifest to represent the current workspace. As shown, this manifest can include at least some of the information collected in step 1 and could be structured in JSON format or another structured data format. Various examples of the type of information a manifest may include are provided in FIG. 3. In step 2b, agent 115 can generate an experience ID for the manifest. For example, agent 115 may create a hash of the manifest and use the hash as the experience ID. In some embodiments, any peripheral characteristics that may be defined in the manifest may be excluded when calculating the hash such that the hash/experience ID represents the collection of peripherals that make up the workspace while not representing the current configuration of such peripherals. In step 2C, agent 115 can sign the experience ID, such as by using a private key that may have been pre-provisioned on user computing device 110. Then, in step 2d, agent 115 can send the manifest and the signed experience ID to workspace management service 200. Accordingly, step 2d represents agent 115 notifying workspace management service 200 that user computing device 110 is part of a workspace and providing workspace management service 200 with the manifest that defines the workspace and an experience ID that uniquely represents the workspace.

Figure 2C:
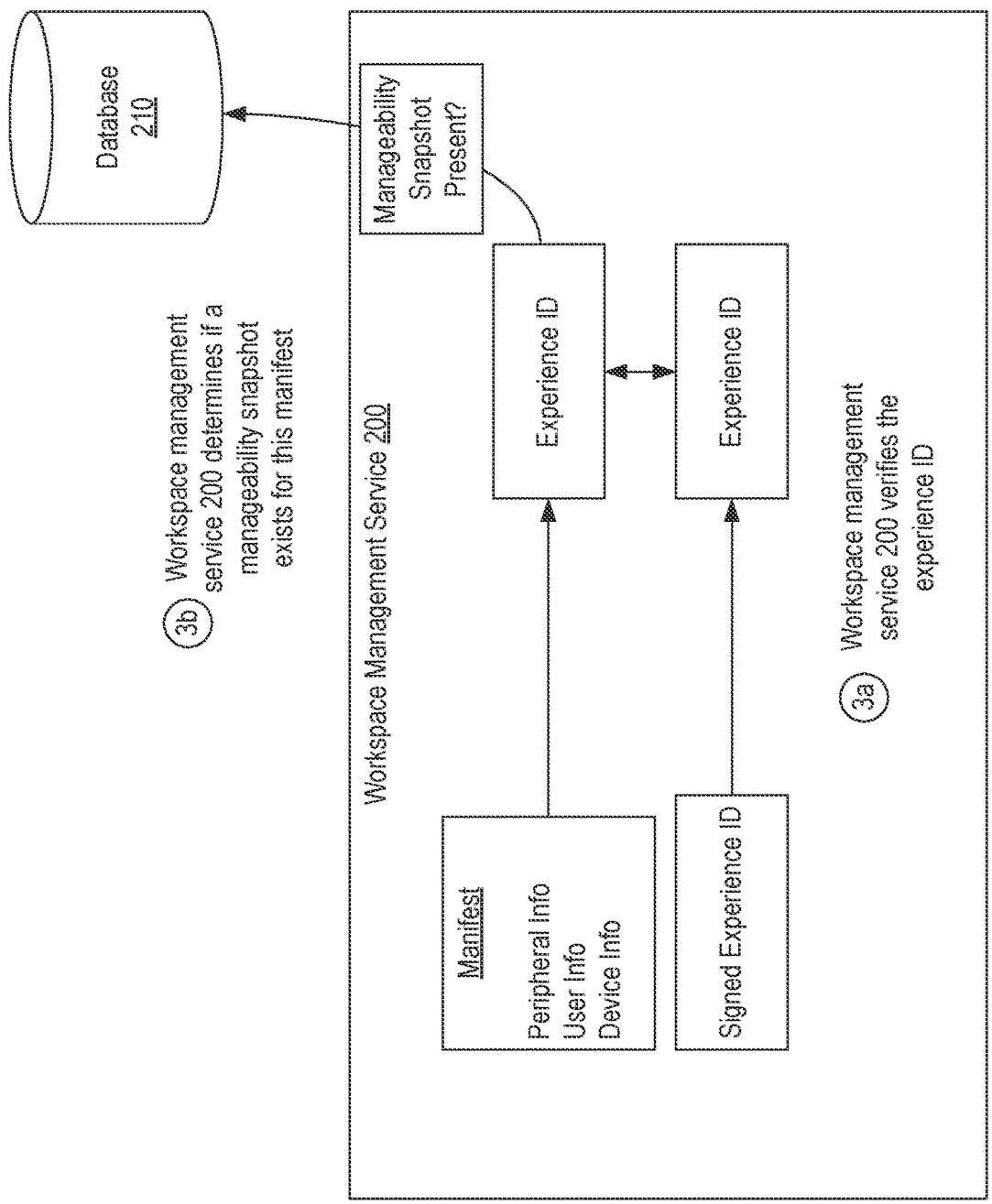

Turning to FIG. 2C, workspace management service 200 is shown as having received the manifest and the signed experience ID from agent 115. Then, in step 3a, workspace management service 200 can verify the experience ID. For example, workspace management service 200 can generate an experience ID from the manifest (e.g., using the same hash algorithm that agent 115 uses) and can also use a public key to generate the experience ID from the signed experience ID. Workspace management service 200 can then compare these two experience IDs to ensure that they match. If so, workspace management service 200 will know that the manifest has not been tampered with and that agent 115 is authorized to report the workspace for user computing device 110. In step 3b, and upon verifying the manifest (or, in other words, upon determining that the report of the workspace is accurate and legitimate), workspace management service 200 can determine whether a manageability snapshot already exists for this manifest (or for the workspace that the manifest defines). In some embodiments, workspace management service 200 may accomplish this by querying database 210 using the experience ID to determine if the experience ID is associated with a manageability snapshot. For purposes of this example, it is assumed that the experience ID is not associated with a manageability snapshot.

Figure 2D:
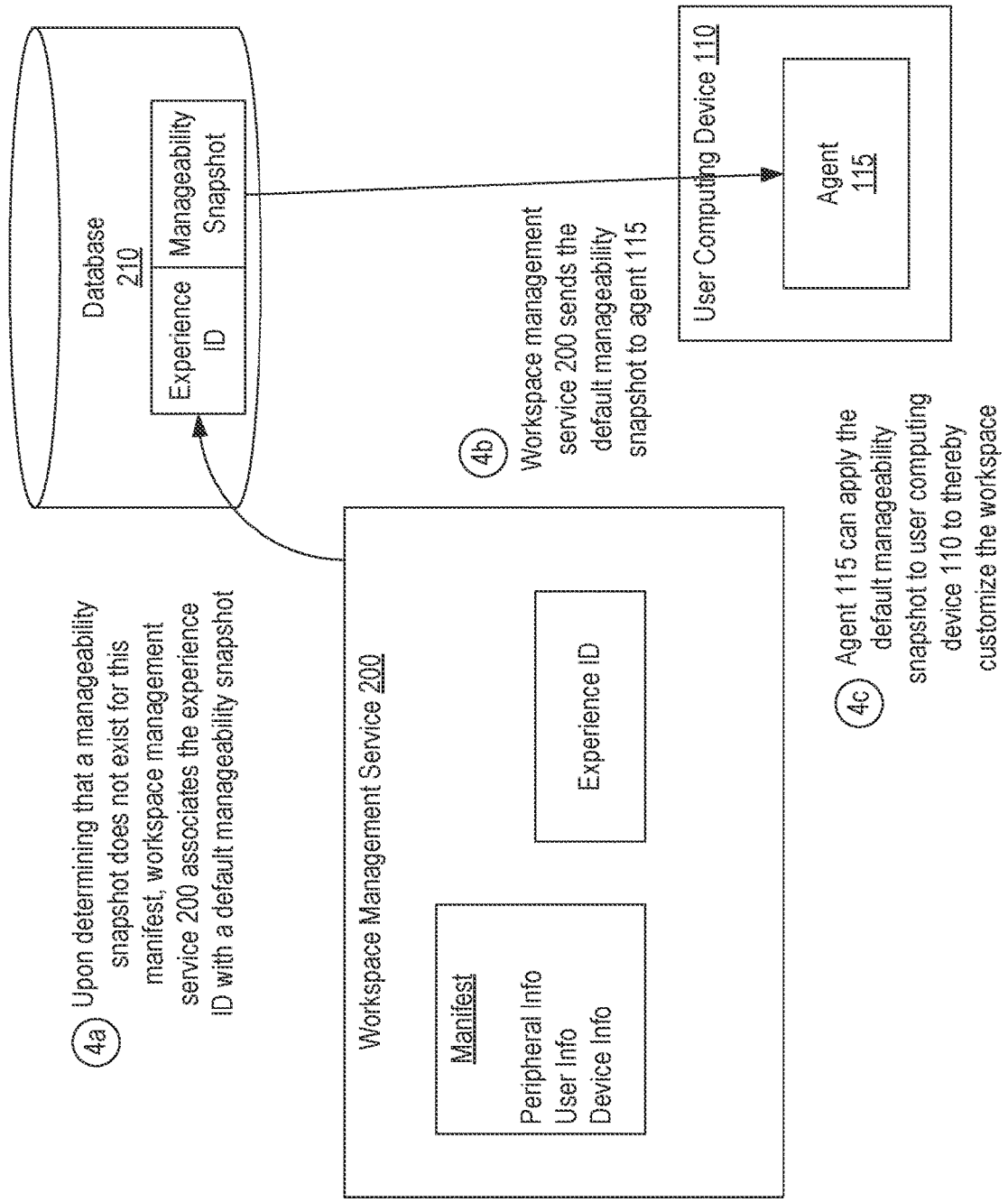

Turning to FIG. 2D, in step 4a, and upon determining that a manageability snapshot does not exist for this manifest (which may be the case the first time that user computing device 110 is part of this workspace), workspace management service 200 may associate the experience ID with a default manageability snapshot. For example, workspace management service 200 may evaluate the manifest to identify which peripherals form part of the workspace may then include default configurations for the peripherals in the manageability snapshot. In some embodiments, workspace management service 200 may consider any current configurations for the peripherals that may be defined in the manifest, the user information and/or the device information as part of selecting/creating the default manageability snapshot. For example, one or more policies may dictate the default configurations to be defined in a default manageability snapshot for a particular user, a particular group of users, a location of the workspace, etc. In step 4b, workspace management service 200 can send the default manageability snapshot to agent 115. Then, in step 4c, agent 115 can apply the default manageability snapshot to user computing device 110 to thereby customize the workspace of which user computing device 110 currently forms a part. Various examples of manageability snapshots are provided in FIG. 4.

Notably, if the user were to subsequently connect user computing device 110 to the same workspace, a similar process would be performed except that workspace management service 200 would determine that the experience ID is already associated with a manageability snapshot. In such cases, workspace management service 200 can send the manageability snapshot back to agent 115 (as opposed to creating a default manageability snapshot). As can be seen, the experience ID provides a mechanism to quickly identify and apply the appropriate manageability snapshot to a workspace.

FIG. 3 provides four simplified examples of the type of information a manifest could include when a user (UserID1) connects his laptop to four different workspaces. These workspaces include two home workspaces and two office workspaces. FIG. 3 also shows that a unique experience ID can be generated for each manifest/workspace. FIG. 4 provides four simplified examples of manageability snapshots that may correspond with the four examples in FIG. 3.

FIGS. 5A-5D provide an example of how agent 115 and workspace management service 200 may employ the experience ID to automatically update a manageability snapshot for a workspace in response to a user changing the configuration of a peripheral in the workspace.

Figure 5A:
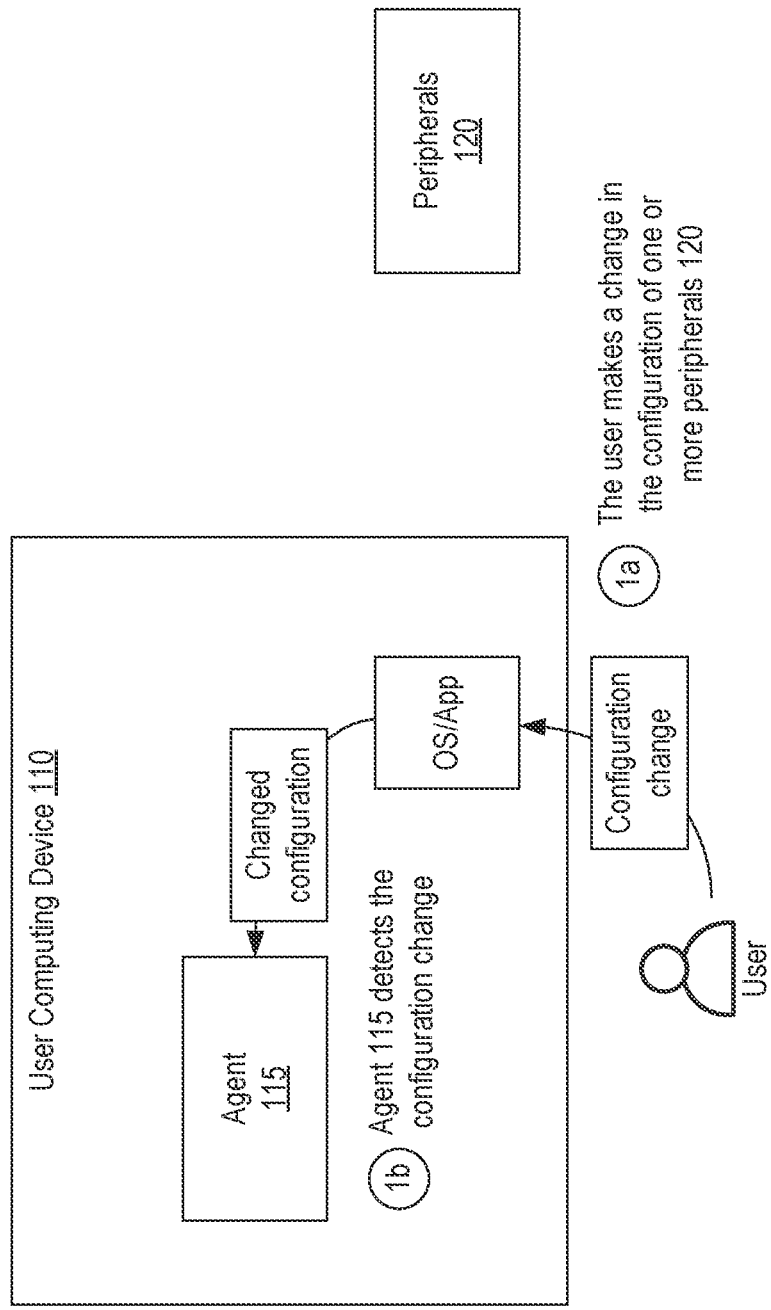
FIGS. 5A-5D provide an example of how a manageability snapshot may be updated using an experience ID in response to detecting a context change in a workspace.

Turning to FIG. 5A, in step 1a, it is assumed that the user (UserID1) interfaces with the operating system, an application, or other available mechanism to change the configuration of one or more of peripherals 120 (e.g., to change the resolution or orientation of a display device). In step 1b, agent 115 can detect this configuration change. For example, agent 115 could be registered with the operating system to be notified of such configuration changes.

Figure 5B:
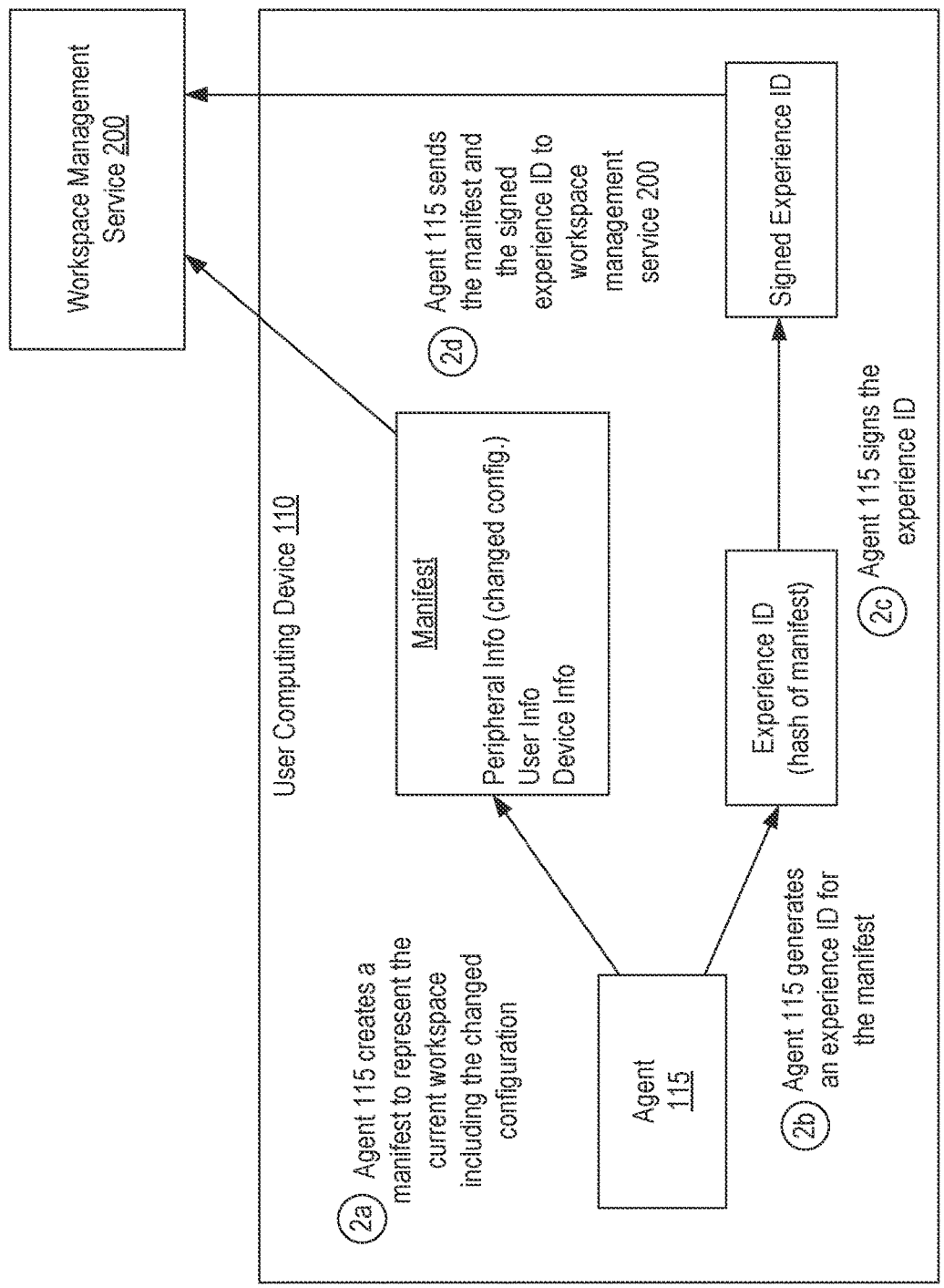

Turning to FIG. 5B, in step 2a, and in response to detecting the change in configuration to a peripheral in the workspace, agent 115 can create a manifest to represent the current workspace in a similar manner as described with reference to FIG. 2B. However, the manifest at this step will include the configuration change. Steps 2b-2d are generally the same as described with reference to FIG. 2B with the notable exception that the manifest sent to workspace management service 200 will include the changed configuration. Also, as mentioned above, the calculation of the experience ID can be performed in a manner that will ensure that it remains the same after the configuration change (e.g., by excluding the peripheral configurations from the calculation of the hash of the manifest). In other words, the workspaces represented in FIGS. 2B and 5B are assumed to be the same (e.g., to have the same set of peripherals) and therefore the experience IDs calculated in FIGS. 2B and 5B should be the same.

Figure 5C:
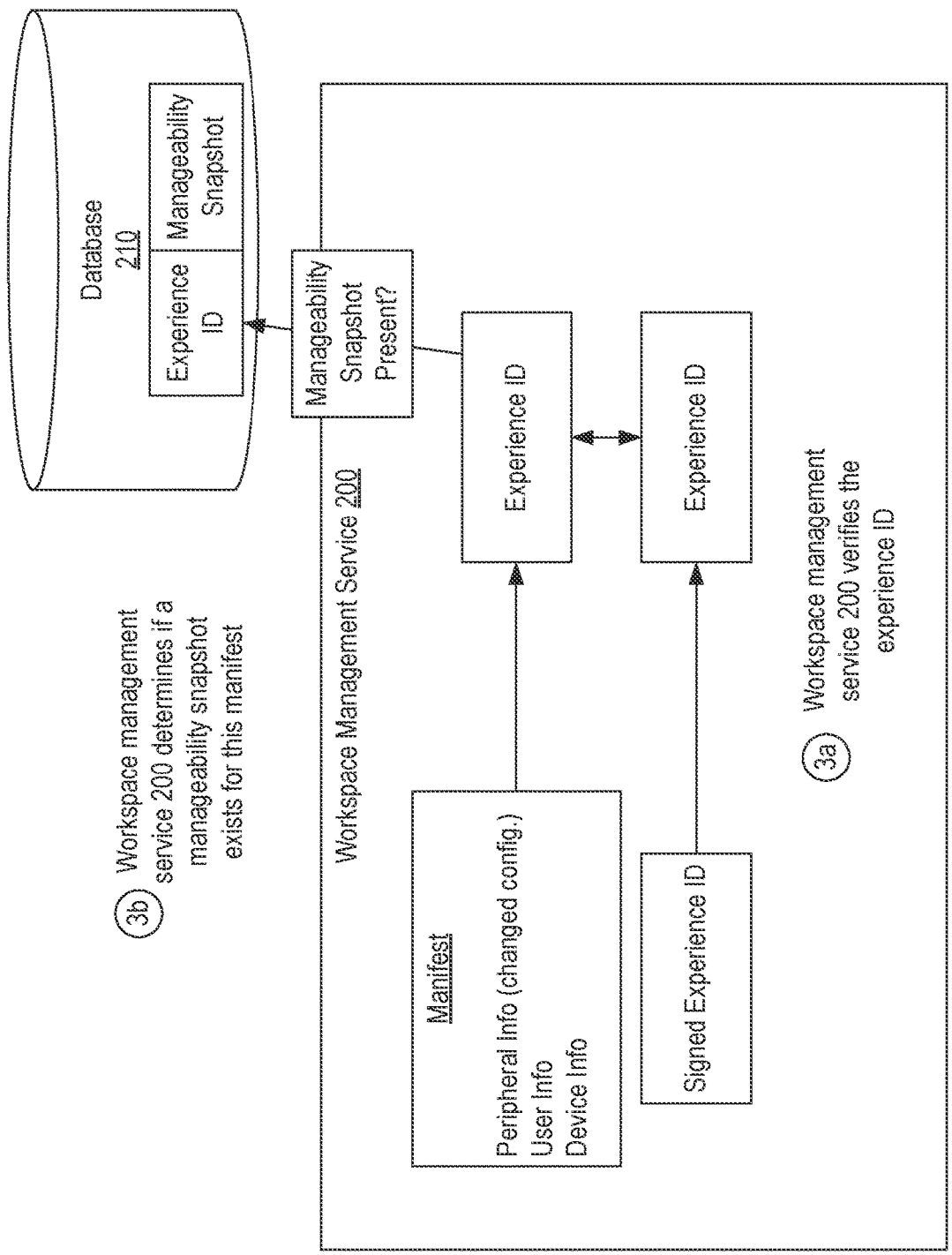

Turning to FIG. 5C, in steps 3a and 3b, workspace management service 200 can verify the experience ID and determine whether a manageability snapshot exits for the experience ID in a similar manner as described with reference to FIG. 2B. However, in this case, workspace management service 200 will determine that the experience ID is associated with a manageability snapshot (e.g., the default manageability snapshot that was created through the process represented in FIGS. 2A-2D).

Figure 5D:
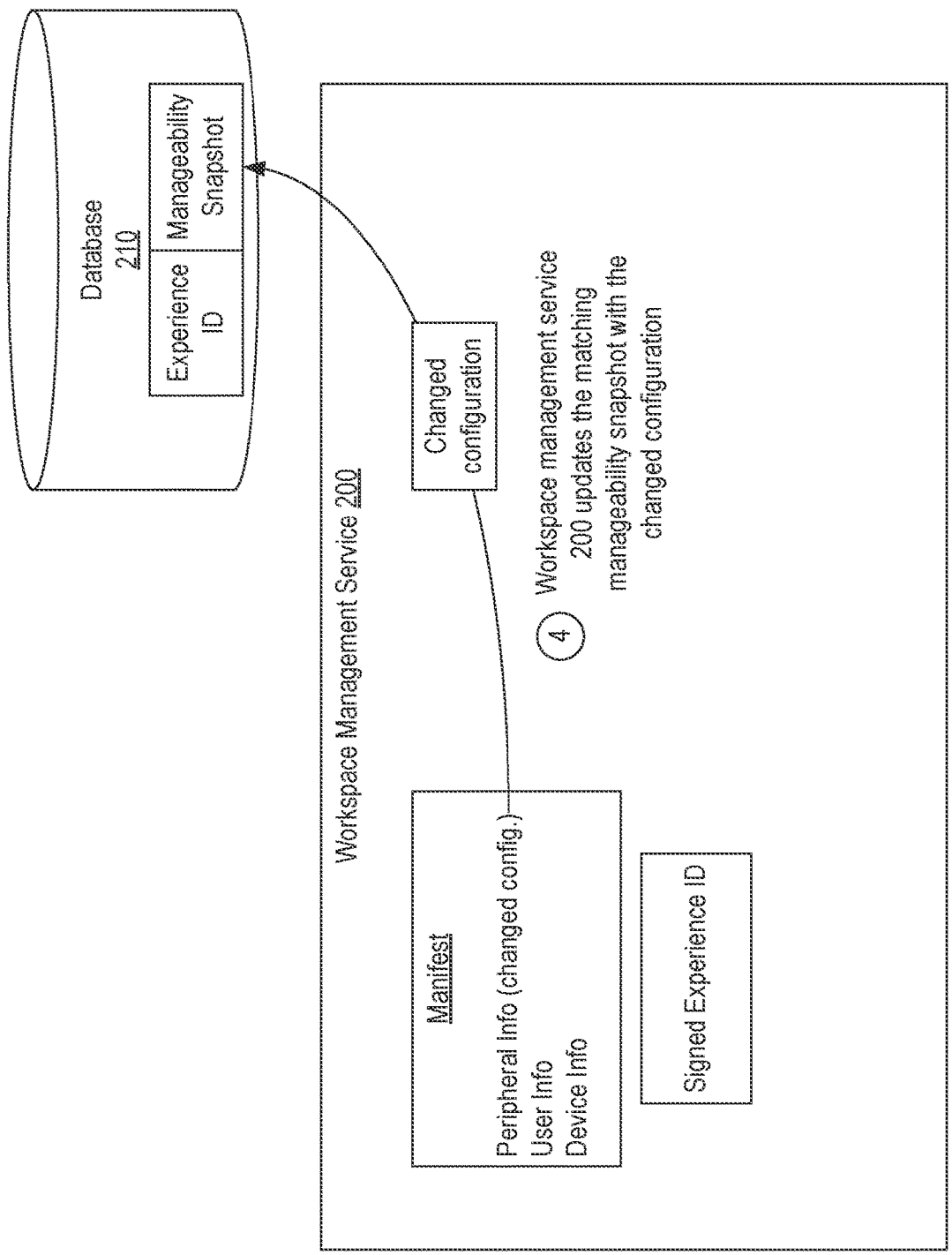

Turning to FIG. 5D, in step 4, and upon determining that a manageability snapshot already exists for the experience ID, workspace management service 200 can update the manageability snapshot to include the changed configuration. For example, if the changed configuration was a change in the orientation of a monitor, an entry in the manageability snapshot could be updated or created to define the changed orientation.

In this way, the experience ID provides a safe and effective mechanism for efficiently reporting and storing changed configurations for a workspace. For example, with the manageability snapshot updated to reflect the user's change to the configuration, anytime the user reconnects his laptop to the workspace, agent 115 can report the workspace via the experience ID and receive back and apply the manageability snapshot to thereby automatically personalize the workspace for the user.

As mentioned above, agent 115 may consider a variety of context when generating a manifest to report a change in configuration of peripherals of a workspace. In some embodiments, in addition to detecting the configuration change in step 1b of FIG. 5A, agent 115 could also determine whether the configuration change corresponds with a day, time, location, etc. For example, agent 115 could determine that the change in configuration occurred on a particular day of the week (e.g., on a Wednesday), at a particular time (e.g., in the afternoon), and/or at a particular location (e.g., at home). In such cases, agent 115 could include information about this day, time and/or location context in the manifest and include this context in the calculation of the experience ID. As a result, the experience ID may lead to the creation of a new manageability snapshot or the update of an existing manageability snapshot that is specific to the day, time and/or location context. Stated another way, multiple manageability snapshots may be applicable to the same set of peripherals but may apply on different days, at different times and/or at different locations.

Agent 115 may also be configured to perform the process represented in FIGS. 2A-2D in response to detecting a change in day, time and/or location context. For example, if agent 115 detects that it is afternoon (and independent of detecting any change in configuration), agent 115 can create and send a manifest which includes this time context and the experience ID to workspace management service 200 to retrieve a manageability snapshot associated with the experience ID. Agent 115 can then apply the manageability snapshot to thereby automatically customize the current workspace to the user's personal afternoon preferences.

In some embodiments, agent 115 may also include application context in a manifest. For example, agent 115 could detect that, shortly after launching an application, the user changes configurations of one or more peripherals. In such cases, the process represented in FIGS. 5A-5D can be performed while also including application context in the manifest thereby leading to the creation of a new manageability snapshot or an update of an existing manageability snapshot that is specific to the application context. Thereafter, whenever agent 115 detects that the application is launched, agent 115 can perform a process similar to what is represented in FIGS. 2A-2D to retrieve, using the experience ID, the manageability snapshot that accounts for the application context.

In summary, embodiments of the present invention allow context-based workspace personalization to be performed using an experience ID. This context includes the set of peripherals that make up the workspace and may also include day context, time context, location context, application context, or some other context.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for performing context-based workspace personalization using an experience ID, the method comprising:
   creating, by an agent executing on a user computing device, a manifest to represent a workspace that includes the user computing device and one or more peripherals, wherein the manifest comprises structured data and identifies each of the one or more peripherals included in the workspace;
   generating an experience ID from the manifest such that the experience ID is generated from the structured data;
   sending the manifest and the experience ID to a workspace management service;
   receiving, from the workspace management service, a manageability snapshot associated with the experience ID; and
   applying the manageability snapshot to thereby customize the workspace.

2. The method of claim 1, wherein the manifest identifies characteristics of each of the one or more peripherals included in the workspace.

3. The method of claim 1, wherein generating the experience ID from the manifest comprises generating a hash of the structured data.

4. The method of claim 1, further comprising:
   signing the experience ID such that the signed experience ID is sent to the workspace management service.

5. The method of claim 1, wherein the manifest identifies a user of the user computing device.

6. The method of claim 1, wherein the manifest identifies other context of the workspace.

7. The method of claim 6, wherein the other context includes one or more of day context, time context, location context, or application context.

8. The method of claim 7, wherein generating the experience ID from the manifest comprises generating a hash of the structured data.

9. The method of claim 8, further comprising:
   detecting a change in the other context;
   wherein the manifest is created in response to detecting the change in the other context.

10. The method of claim 1, further comprising:
    detecting a configuration change to at least one of the one or more peripherals;
    in response to detecting the configuration change, again creating a manifest to represent the workspace and again generating the experience ID from the manifest, wherein the manifest includes the configuration change;

sending the manifest, including the configuration change, and the experience ID to the workspace management service;

using the experience ID to locate the manageability snapshot associated with the experience ID; and updating the manageability snapshot to include the configuration change.

11. The method of claim 10, wherein the configuration change is detected in conjunction with detecting a change in other context, the method further comprising:

including the change in the other context in the manifest.

12. The method of claim 11, wherein the experience ID is generated based on the change in the other context.

13. A system comprising:

a workspace management service; and at least one user computing device on which an agent is executed, the agent being configured to:

create a manifest to represent a workspace that includes the user computing device and one or more peripherals;

generate an experience ID from the manifest by generating a hash from information identifying the one or more peripherals in the manifest; and send the manifest and the experience ID to the workspace management service;

receive, from the workspace management service, a manageability snapshot associated with the experience ID; and apply the manageability snapshot to thereby customize the workspace.

14. The system of claim 13, wherein the agent generates the experience ID from the manifest by generating the hash also from information identifying one or more of day context, time context, location context, or application context.

15. The system of claim 13, wherein the agent signs the experience ID and sends the signed experience ID to the workspace management service.

* * * * *